United States Patent
Silva, Jr. et al.

(10) Patent No.: US 11,752,380 B2
(45) Date of Patent: *Sep. 12, 2023

(54) PUSH-TO-CONNECT-ROTATE-TO-RELEASE SPRINKLER ASSEMBLY AND FITTING

(71) Applicant: Tyco Fire Products LP, Lansdale, PA (US)

(72) Inventors: Manuel R. Silva, Jr., Cranston, RI (US); Kevin W. Pressnell, Athens, AL (US); Steven Lee Shields, Lubbock, TX (US); Gary J. Luiz, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,713

(22) Filed: Jun. 8, 2022

(65) Prior Publication Data

US 2022/0296946 A1 Sep. 22, 2022

Related U.S. Application Data

(63) Continuation of application No. 16/645,152, filed as application No. PCT/US2018/050030 on Sep. 7, 2018, now Pat. No. 11,376,456.

(Continued)

(51) Int. Cl.
*A62C 35/68* (2006.01)
*B05B 15/65* (2018.01)
*F16L 37/091* (2006.01)

(52) U.S. Cl.
CPC .............. *A62C 35/68* (2013.01); *B05B 15/65* (2018.02); *F16L 37/091* (2013.01)

(58) Field of Classification Search
CPC .......... A62C 35/68; B05B 15/65; F16L 37/091
(Continued)

(56) References Cited

U.S. PATENT DOCUMENTS

| 4,083,410 A | 4/1978 | Anderson |
| 5,098,241 A | 3/1992 | Aldridge et al. |

(Continued)

FOREIGN PATENT DOCUMENTS

GB  1 911 17498  11/1911

OTHER PUBLICATIONS

International Search Report and Written Opinion for International Application No. PCT/US2018/050030, dated Nov. 9, 2018, 11 pages.

*Primary Examiner* — Christopher S Kim
(74) *Attorney, Agent, or Firm* — Foley & Lardner LLP (57) ABSTRACT

A sprinkler assembly includes a fire protection sprinkler and a push-to-connect-rotate-to-release (PCRR) fitting. The fire protection sprinkler has a body defining an inlet and an outlet, a deflector spaced from the outlet, the body having an outer encasing surface surrounding a first longitudinal axis, the outer encasing surface including a seal member disposed about the encasing surface and a helical surface between the deflector and the seal member. The PCRR fitting includes a tubular member with a first end, a second end, an exterior surface, and an inner surface defining an internal conduit extending along a second longitudinal axis, the body received in the internal conduit such that the first longitudinal axis is axially aligned with the second longitudinal axis, the inner surface including a sealing surface portion circumscribed about the second longitudinal axis. The gripper ring is disposed along the inner surface and in contact with the helical surface.

20 Claims, 11 Drawing Sheets

Related U.S. Application Data

(60) Provisional application No. 62/556,007, filed on Sep. 8, 2017.

(58) Field of Classification Search
USPC .......................................................... 169/37
See application file for complete search history.

(56) References Cited

U.S. PATENT DOCUMENTS

| | | |
|---|---|---|
| 8,381,825 B1 | 2/2013 | Golinveaux et al. |
| 11,376,456 B2 * | 7/2022 | Silva, Jr. ................. A62C 35/68 |
| 11,614,191 B2 * | 3/2023 | Silva, Jr. ................. A62C 37/11 |
| | | 169/37 |
| 2012/0273058 A1 | 11/2012 | Spears |
| 2014/0097274 A1 | 4/2014 | Smyrl |
| 2014/0346256 A1 | 11/2014 | Abels et al. |
| 2015/0115602 A1 | 4/2015 | Clason et al. |

* cited by examiner

PUSH-TO-CONNECT-ROTATE-TO-RELEASE SPRINKLER ASSEMBLY AND FITTING

CROSS-REFERENCE TO RELATED APPLICATIONS

The present disclosure is a continuation of U.S. patent application Ser. No. 16/645,152, filed Mar. 6, 2020, which is a national phase application of International Application No. PCT/US2018/050030, filed Sep. 7, 2018, which claims the benefit of and priority to U.S. Provisional Application No. 62/556,007, titled "PUSH-TO-CONNECT-ROTATE-TO-RELEASE SPRINKLER ASSEMBLY AND FITTING," filed Sep. 8, 2017. The contents of U.S. patent application Ser. No. 16/645,152, International Application No. PCT/US2018/050030, and U.S. Provisional Application No. 62/556,007 are incorporated herein by reference in their entirety for all purposes.

BACKGROUND

The present disclosure relates generally to fire protection devices and more specifically to fire protection sprinkler assemblies, fittings and connections.

SUMMARY

Embodiments of a fire protection sprinkler assembly are provided having a "push-to-connect-rotate-to-release" (PCRR) connection or fitting for coupling to fluid supply pipes. The sprinkler assembly includes the PCRR connection fitting in which a sprinkler body is inserted into the tubular fitting to form a fluid tight connection. The sprinkler assembly provides that the fluid tight connection can be formed by linearly and coaxially inserting the sprinkler body into the fitting, e.g., pushing to connect the sprinkler body to the fitting without relative rotation. In some embodiments, the external configuration of the sprinkler body and the internal configuration of the PCRR fitting cooperate with one another to permit the relative linear translation between the sprinkler body and the fitting to form the fluid tight seal. In some embodiments, the respective external and internal configuration of the sprinkler body also allow for the sprinkler body to be advanced into further engagement with the fitting by relative rotation between the components, for example, by threaded engagement.

In some embodiments, the PCRR fitting maintains the connection and resists decoupling between the sprinkler body and the fitting. The fitting and sprinkler engagement can be limited or configured to require both axial and rotational relative translation with respect to one another in order to separate the sprinkler and fitting components, e.g., rotating to release the sprinkler body from the fitting. In some embodiments, the sprinkler body is withdrawn from the fitting by rotationally translating the sprinkler body from the fitting. In some embodiments, the relative rotational translation between the sprinkler assembly components can provide a mechanism to relieve pressure from the sprinkler assembly under fluid pressure. In some embodiments, with the sprinkler assembly and its fitting connected to a fluid supply pipe and under fluid pressure, the sprinkler body can be rotated to begin to withdraw the sprinkler body from the fitting. Continued relative rotation can initially separate the sealed engagement between the sprinkler body thereby providing pressure relief, if necessary, before completely separating the sprinkler body and the fitting. Thus, the assembly can provide a safety mechanism for replacing and maintaining an installed sprinkler. The sprinkler body can include an externally disposed and secured seal member. Accordingly, removal of the sprinkler body can facilitate removal of the seal member for repair or replacement.

In some embodiments, a sprinkler assembly includes a fire protection sprinkler having a body defining an inlet and an outlet with a passageway extending between the inlet and the outlet along a first longitudinal axis and a deflector supported by the body and spaced from the outlet. The body has an outer encasing surface that surrounds the first longitudinal axis. The outer encasing surface includes a seal member disposed about the encasing surface and a helical surface between the deflector and the seal member. The assembly also includes a push-to-connect-rotate-to-release (PCRR) fitting that includes a tubular member with a first end for connection to a fluid supply pipe and a second end for receiving the sprinkler body. The tubular member includes an exterior surface and an inner surface in which the inner surface defines an internal conduit extending along a second longitudinal axis for receipt of the body of the sprinkler. The inner surface can include a sealing surface portion circumscribed about the second longitudinal axis with a gripper ring disposed along the inner surface of the tubular member. In the assembly, the gripper ring is in contact with the helical surface of the sprinkler body. The engagement between the gripper ring and the helical surface can allow for the sprinkler body to be advanced into or out of the tubular member in order to respectively finely locate the seal member along the sealing surface or remove the sprinkler body from the tubular member.

In some embodiments, a PCRR fitting includes a first tubular member having a first end and a second end with an outer surface and inner surface to define an internal passageway extending from the first end to the second end along a first longitudinal axis. The outer surface of the first tubular member includes a seal member secured about the outer surface and an external helical surface formed along the outer surface and axially spaced from the seal member. The inner surface of the first tubular member can include an internal thread for receipt of the fire protection sprinkler. The PCRR fitting can include a second tubular member with a first end for connection to the fluid supply pipe fitting and a second end for receiving the first tubular member. The second tubular member includes an exterior surface and an inner surface, the inner surface defining a second internal conduit extending along a second longitudinal axis. The first tubular member is received in the second internal conduit such that the first longitudinal axis is axially aligned with the second longitudinal axis. The inner surface of the second tubular member includes a sealing surface portion circumscribed about the second longitudinal axis with a gripper ring disposed along the inner surface of the second tubular member and in contact with the external helical surface of the first tubular member.

In another aspect, a method is provided for forming a PCRR connection between a sprinkler body and a tubular member in a fluid tight connection and releasing the sprinkler body from the fluid tight connection. The method includes linearly translating a helical portion of an encasing surface of the sprinkler body in a first direction against a gripper ring affixed within an internal conduit of the tubular member extending along a longitudinal axis; and limiting translation of the sprinkler body with respect to the gripper ring in a second direction opposite the first direction to linear and rotational translation.

BRIEF DESCRIPTION OF THE DRAWINGS

The accompanying drawings, which are incorporated herein and constitute part of this specification, illustrate embodiments of the present disclosure, and together, with the general description given above and the detailed description given below, serve to explain the features of the present disclosure. It should be understood that the disclosed embodiments are some examples of the present disclosure as provided by the appended claims.

DETAILED DESCRIPTION

Figure 1:
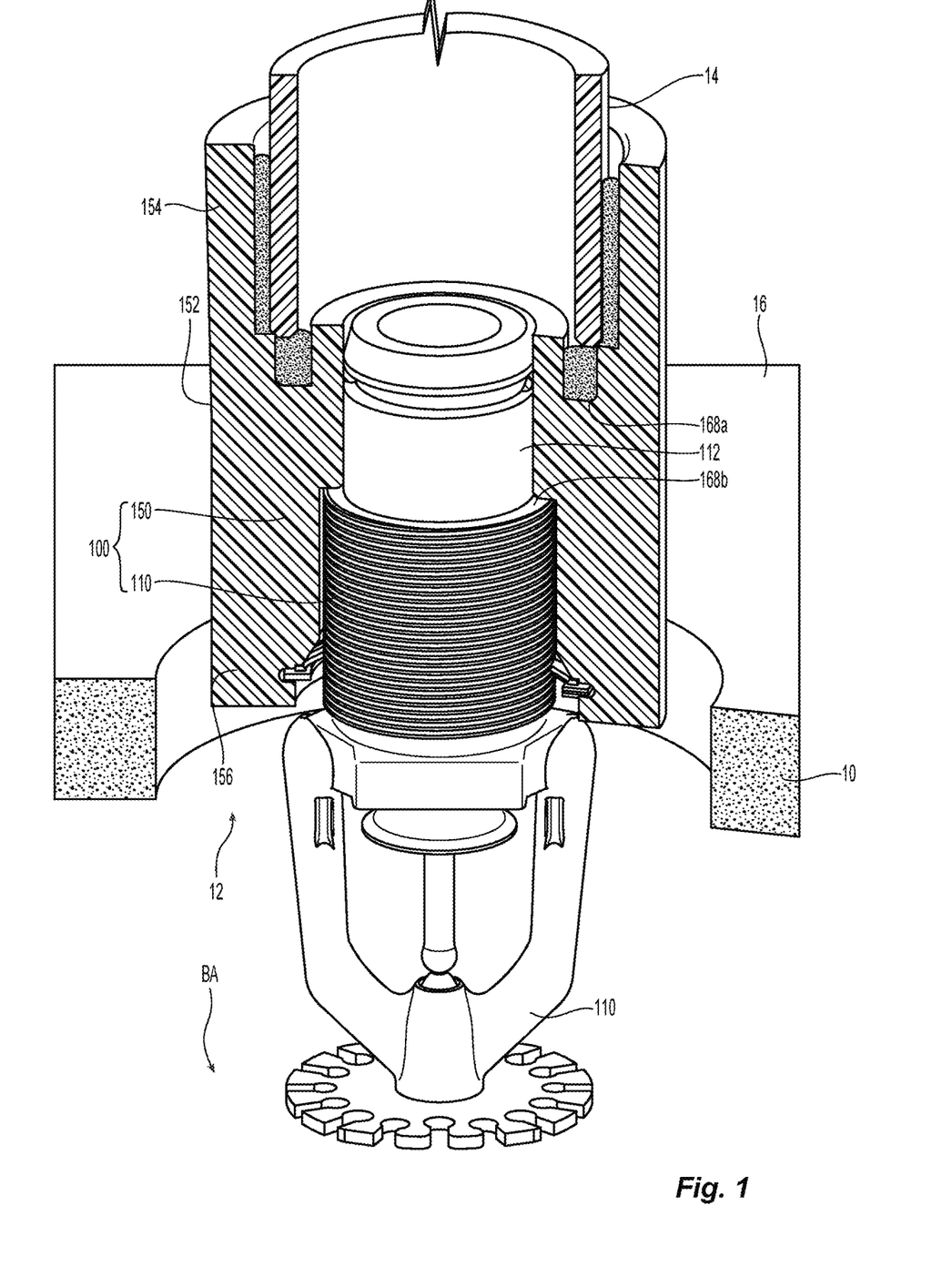
FIG. 1 is a diagram of an embodiment of a sprinkler assembly in an illustrative installation.

FIG. 1 depicts a sprinkler assembly 100 for the protection of an area, e.g., the protection area PA. The sprinkler assembly 100 is connected to a firefighting fluid supply pipe or pipe fitting 14. The mounted sprinkler can extend through a hole opening 12 in a barrier, such as for example, a ceiling barrier 10 or wall. The hole can be finished with an escutcheon (not shown) to surround the sprinkler. The sprinkler assembly 100 includes a fire protection sprinkler 110 and a connection fitting 150, e.g., a "push-to-connect-rotate-to-release" (PCRR) connection fitting 150 to connect the sprinkler 110 to fluid supply piping or fitting 14. One end of the fitting 150 can connect to the fluid supply fitting 14. At the opposite end, the fitting 150 can connect to the sprinkler 110. Connection between the PCRR fitting 150 and the sprinkler 110 is formed by axially inserting or pushing the sprinkler 110 into the end of the fitting 150 to form a fluid tight connection. The PCRR fitting 150 maintains the connection and resists decoupling between the sprinkler 110 and the fitting 150. The fitting 150 and its engagement with the sprinkler 110 can require both axial and rotational relative translation with respect to one another in order to separate the components. By requiring the relative rotation, separation of the components cannot be realized by simple axial translation or pulling of the sprinkler from the fitting. This ensures that the assembly 100 remains intact in the presence of fluid pressure and connection is maintained in the event of accidental bumping of the assembly. In some embodiments, the fitting and sprinkler engagement provides for fluid pressure relief, which can facilitate safe replacement and/or maintenance of the sprinkler assembly and its components.

Figure 2A:
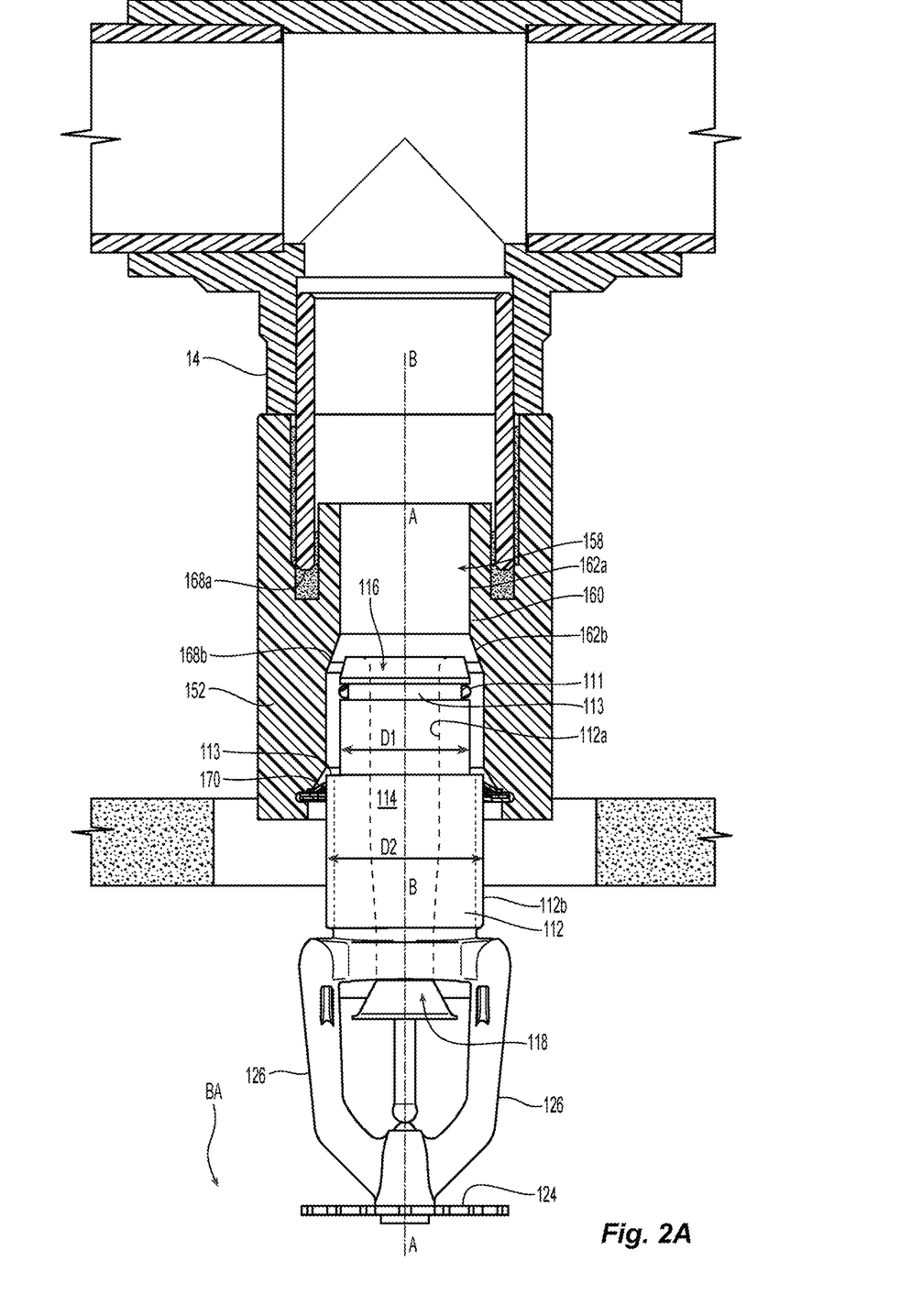
FIG. 2A is a partial cross-sectional view of the sprinkler assembly of FIG. 1 in an installation in an unsealed condition.
Figure 2B:
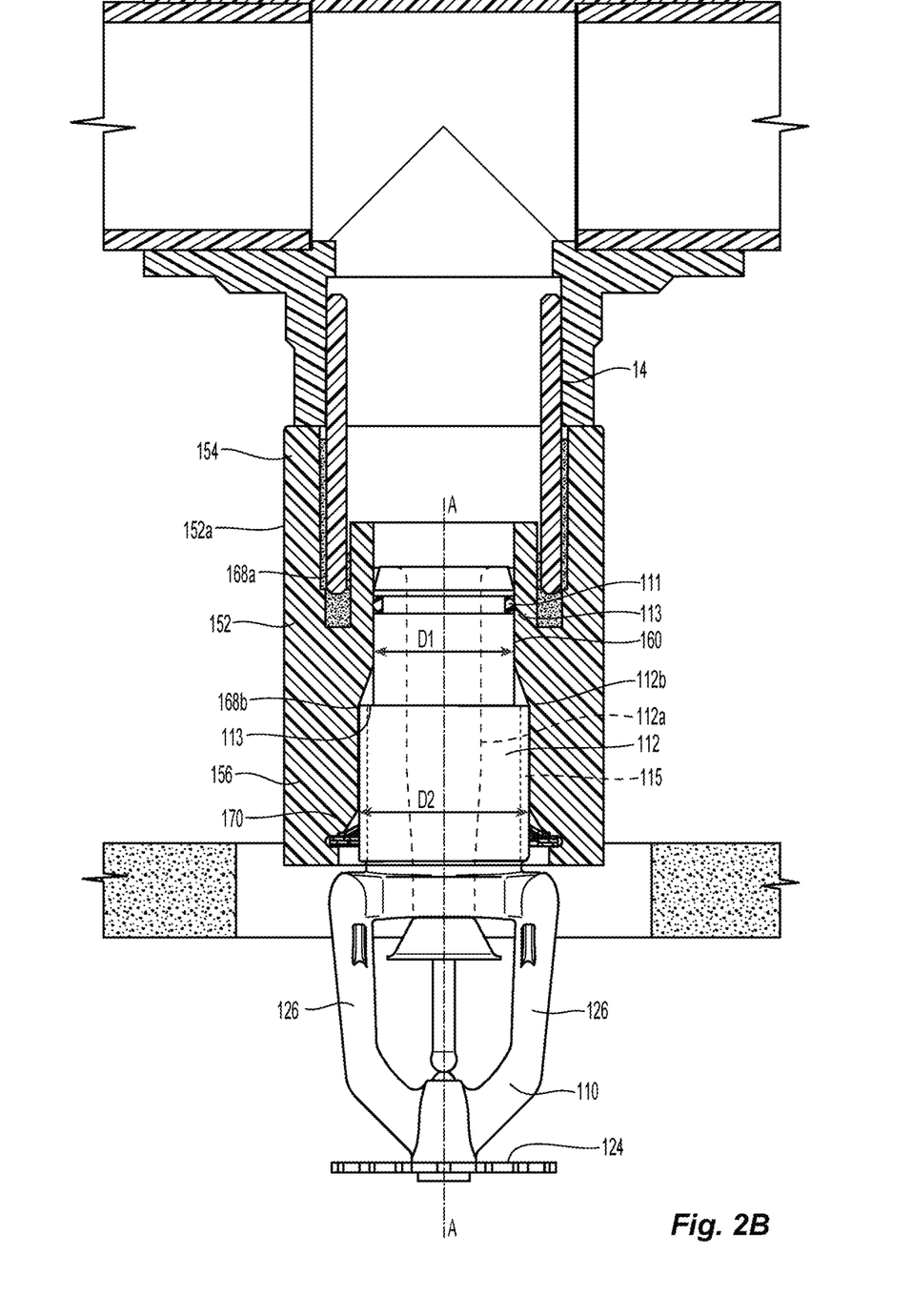
FIG. 2B is a partial cross-sectional view of the sprinkler assembly of FIG. 1 in an installation in an sealed condition.
Figure 9:
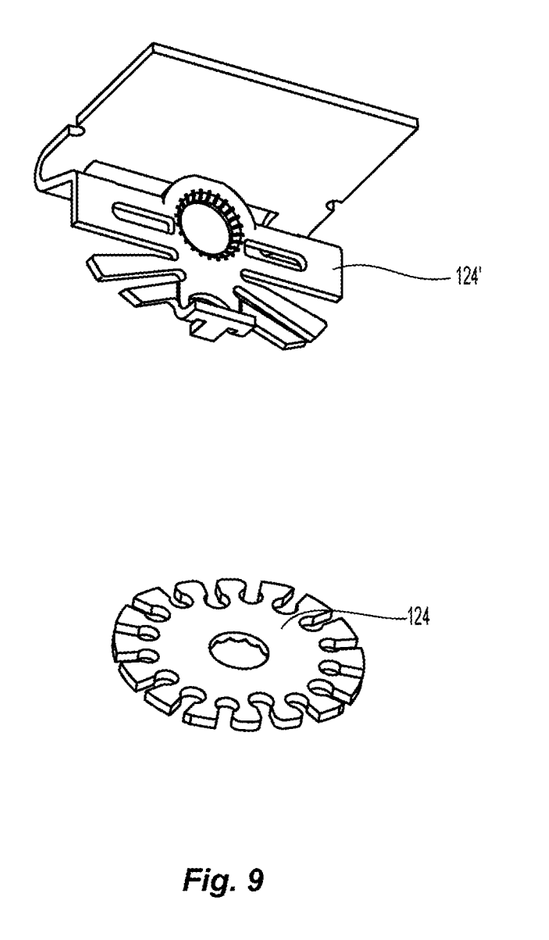
FIG. 9 are deflectors for use in the sprinkler assemblies of FIGS. 1 and 8.

With reference to FIGS. 2A and 2B, the fire protection sprinkler 110 has a body 112 that includes an internal surface 112a extending along a first longitudinal axis A-A defining an internal passageway 114 extending between an inlet 116 and an outlet 118 of the body 112. The sprinkler 110 includes a deflector 124 supported by the body 112 and spaced from the outlet 118. As depicted, the deflector 124 can be secured to a pair of frame arms 126 which depend from the sprinkler body 112. As depicted, the frame arms 126 locate the deflector 124 at the desired fixed axial distance from the outlet 118. In some embodiments, the frame arms can provide for a "drop down" arrangement in which the arms deploy from an unactuated concealed position to an actuated deployed position. The internal passageway 114 and outlet 118 are dimensioned and geometrically configured so as to affect desired discharge characteristics for the deflector 124 to provide for a sprinkler spray pattern that can effectively address a fire. The deflector can have any suitable geometry and configuration for a particular application. For example, as depicted in FIG. 9, the deflector can be configured as a substantially planar member 124 used in a pendent configuration or a hooded deflector 124 for use in a horizontal orientation. The deflector can be domed for an upright sprinkler construction.

The body 112 has an outer encasing surface 112b that surrounds the longitudinal axis A-A, and can form a fluid tight sealed connection with the connection fitting 150. In some embodiments, the outer encasing surface 112b of the sprinkler 110 can include a seal member 111 disposed about the encasing surface to form a fluid tight seal within the fitting 150. In some embodiments, the outer encasing surface 112b includes an annular groove 113 that is formed about and circumscribes the body 112 with the sealing member 111 disposed and secured within the annular groove 113. The outer encasing surface 112b also can include a helical surface 115 that is formed between the deflector 124 and the seal member 111. The outer encasing surface 112b and, in some embodiments, the helical surface 115, forms a mechanical connection with the fitting 150 to adjustably form and locate the fluid tight seal of the seal member 111 within the fitting 150.

Figure 3:
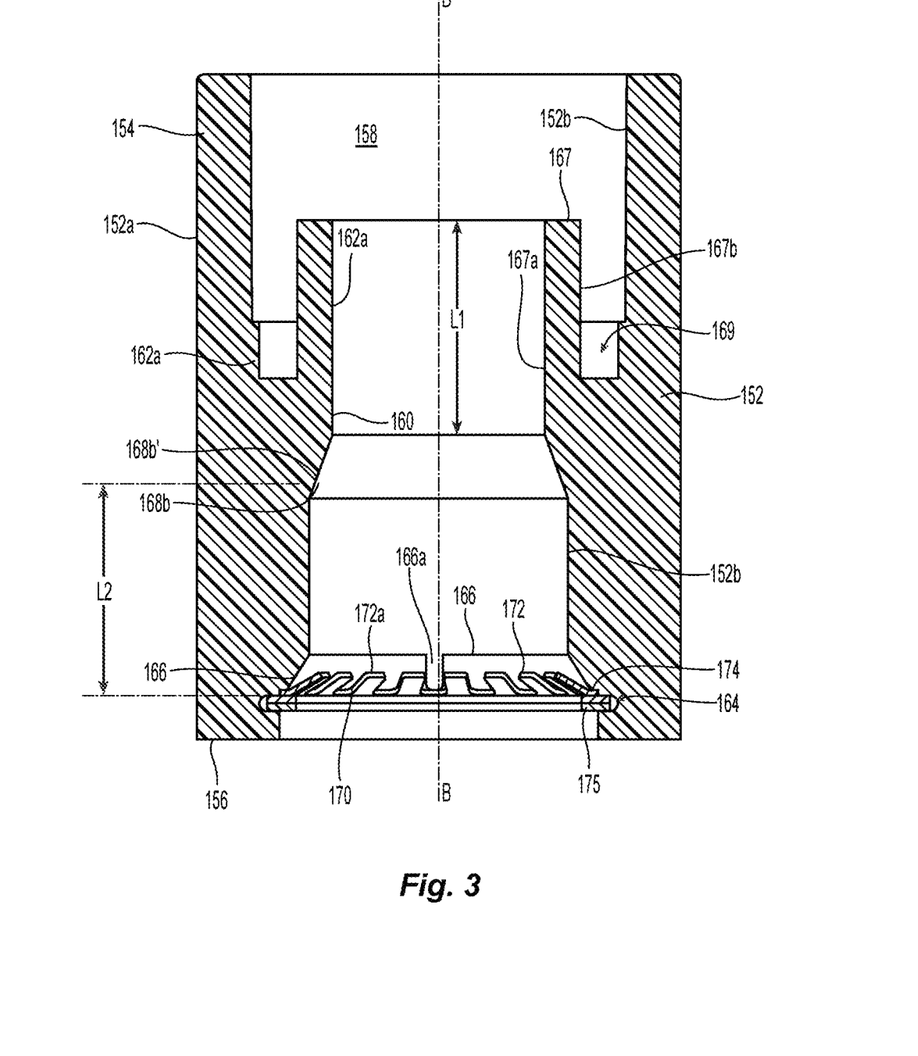
FIG. 3 is a diagram of an embodiment of a push-to-connect-rotate-to-release fitting.

With reference to FIGS. 2A-2B and 3, in some embodiments the PCRR fitting 150 includes a tubular member 152 with a first end 154 for connection to the fluid supply pipe or fitting 14 and a second end 156 for receiving the sprinkler body 112. The tubular member 152 includes an exterior surface 152a and an inner surface 152b that defines an internal conduit 158 which extends along a second longitudinal axis B-B. The sprinkler body 112 is received in the internal conduit 158 at the second end 156 such that the sprinkler 110 and the tubular member 152 are substantially coaxially aligned with one another with the first longitudinal axis A-A substantially axially aligned with the second longitudinal axis B-B.

A portion of the inner surface 152b of the tubular member 152 can define or form a sealing surface portion 160 which circumscribes the second longitudinal axis B-B and extends axially in the direction of the second longitudinal axis B-B. The sealing surface 160 can form a fluid tight seal with an appropriate sealing member, such as for example, the annular sealing member 111 of the sprinkler body 110 upon insertion and engagement. The cylindrical sealing surface 160 defines the narrowest portion or smallest internal diameter of the internal conduit 158 of the tubular member 152. The sealing surface 160 has a first end 162a and a second end 162b with the axial length of the sealing surface 160 extending between the first and second ends 162a, 162b to define the range over which the sealing contact between the surface 160 and the sealing member 111 can be located. By providing a range of locations over which a fluid tight seal can be formed, there is flexibility in completing the sprinkler assembly 100 and the relative spacing between the components of tubular member 152 and the sprinkler 110.

To axially and adjustably locate the seal member 111 into sealing contact with the sealing surface 160, the sprinkler 110 is initially inserted into the tubular member 152, as seen in FIG. 2A, and the sprinkler is axially or linearly pushed or driven into the internal conduit 158 such that the seal member 111 of the sprinkler 110 is in fluid sealing contact with the sealing surface 160 location, as seen for example in FIG. 2B. To maintain the sprinkler 110 coupled to the tubular member 152 and prevent undesired or accidental axial translation or withdrawal out of the tubular member, the sprinkler 110 is mechanically and adjustably axially held, retained or supported within the tubular member 152 by a gripper ring 170 which is disposed along the inner surface 152b of the tubular member 152 of the PCRR fitting 150. In some embodiments, the engagement and interaction with the fitting 150 allow the sprinkler and its deflector 124 to be adjustably located with respect to other structures, such as for example, the ceiling barrier 10.

Depicted in FIGS. 3-6 are embodiments of a gripper ring 170 which includes an annular base 174 from which fingers or prongs 172 extend radially inward and are equiangularly spaced about the ring's center. Each of fingers or prongs 172 is a resilient member which flexes with respect to the annular base 174 to vary the distance of the radially innermost end 172a of the finger from the ring center. The gripper ring 170 can be disposed within the tubular member 152 to circumscribe the longitudinal axis B-B. The inner surface 152b of the tubular member can include an internal groove 164 to house the annular base 172 of the gripper ring 170. The fitting 150 can include a separate support or retainer ring 175 disposed within the groove 164 to axially support the gripper ring 170. The inner surface 152b of the tubular member 152 can include one or more skewed or chamfered surfaces 166 completely or partially circumscribing the longitudinal axis B-B to provide a limiting surface to the fingers 172 upon its flex with respect to the annular base 172. In some embodiments, the chamfered surfaces 166 are spaced apart by one or more projections or formations 166a, which extend toward the longitudinal axis B-B. The projections 166a engage the gripper ring 170 to prevent the gripper ring 170 from rotation about the axis B-B within the tubular member 152. The chamfered surface 166 can be contiguous with the circular groove 164. The PCRR fitting can include a separate spacing annular insert 166', as depicted for example in FIG. 6, that provides the angled limiting surface for the gripper ring 170. The internal surface 152b of the tubular member 152 can be configured to house the spacing insert 166'.

Referring again to FIGS. 1 and 2A-2B, the inner surface 152b also includes stop surfaces to limit the insertion of the fluid supply pipe fitting 14 and the sprinkler 110. In some embodiments, internally from the first end 154 of the tubular member 152 is a first stop surface 168a spaced from the first end 154 to define an insertion depth for the fluid supply pipe 14. The tubular member 152 can include a second stop surface 168b to limit insertion of the sprinkler body 112. The second end 156 of the tubular member 152 can include or form the second stop surface 168b that interferes with the sprinkler frame arms 126 or other portion of the sprinkler body 112 to limit the insertion of the sprinkler body 112. The sealing surface portion 160 or a portion thereof can extend between the first and second stop surface 168a, 168b. The axial length between the second stop surface 168b and the retainer ring 175 is greater than the axial length of the sealing surface 160 extending between the first and second stop surfaces 168a, 168b. In some embodiments, as seen for example in FIGS. 2A-2B and 3, the first stop surface 168a defines, at least in part, an annular channel 169 for housing an end of the fluid supply pipe 14. The formation of the inner surface 152b along the sealing surface 160 can provide an annular wall 167 circumscribed about the second longitudinal axis B-B. More particularly, the annular wall 167 has a first surface 167a extending along the sealing surface and a second surface 167b opposite the first surface 167a and spaced from the internal surface 152b to form an annular channel 169 to house the end of the fluid supply pipe 14.

In the illustrative installation depicted in FIGS. 1 and 2A-2B, the PCRR fitting 150 is coupled to a tee fitting by the pipe fitting 14. In some embodiments, the supply piping and pipe fittings are constructed from thermoplastic material, such as Chlorinated Poly (Vinyl Chloride) (CPVC) material suitable for use in fire sprinkler systems. The supply pipe or fittings can be formed from metallic material, such as for example, steel or brass, etc. The tubular member 152 of the PCRR fitting 150 can be constructed from similar materials. In the case where the fluid supply pipe 14 is CPVC or other plastic or polymeric material to be affixed within the fitting 150 by chemical sealant, adhesive, cement or glue, the annular channel 169 can provide a reservoir for receiving and housing excess sealant which may otherwise seep onto the sealing surface 160 and negatively interfere with the sealed engagement between the fitting 160 and the sprinkler seal member 111. The end of the fluid supply pipe 14 defines a wall thickness and the width of the annular channel 169 can be greater than the wall thickness of the pipe end to provide the capacity within the annular channel 169 for the reservoir.

Figure 4:
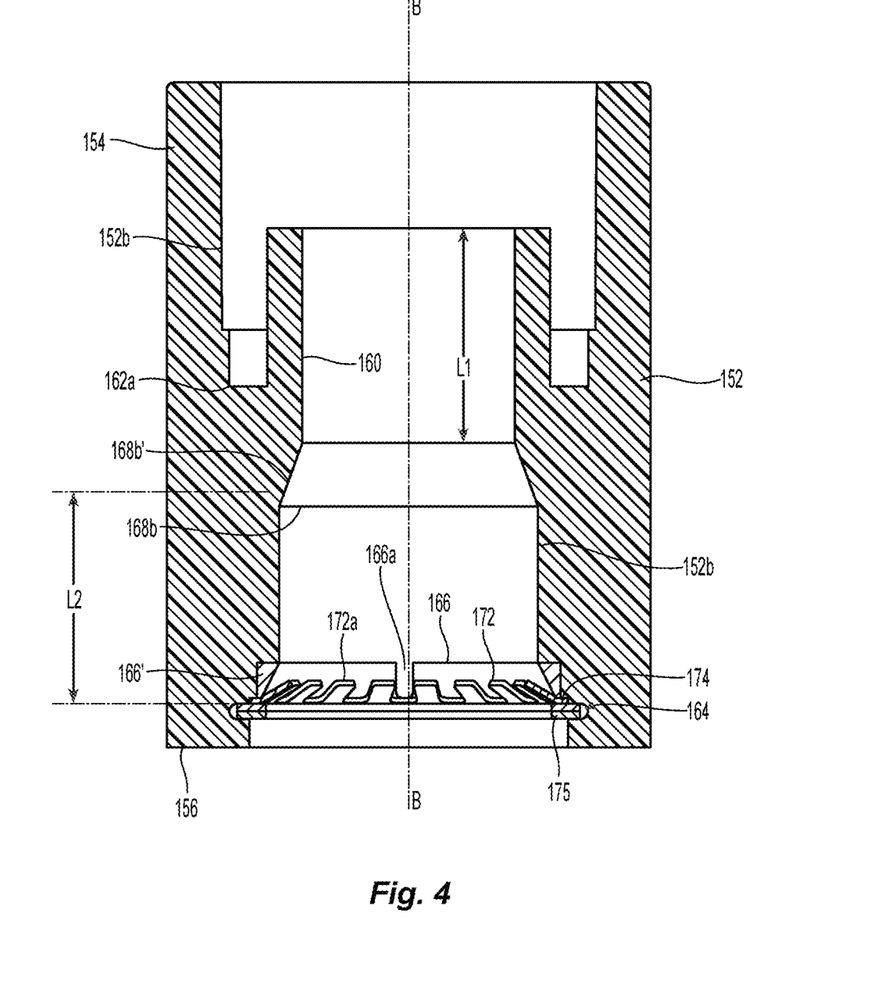
FIG. 4 is a diagram of an embodiment of a push-to-connect-rotate-to-release fitting.
Figure 5:
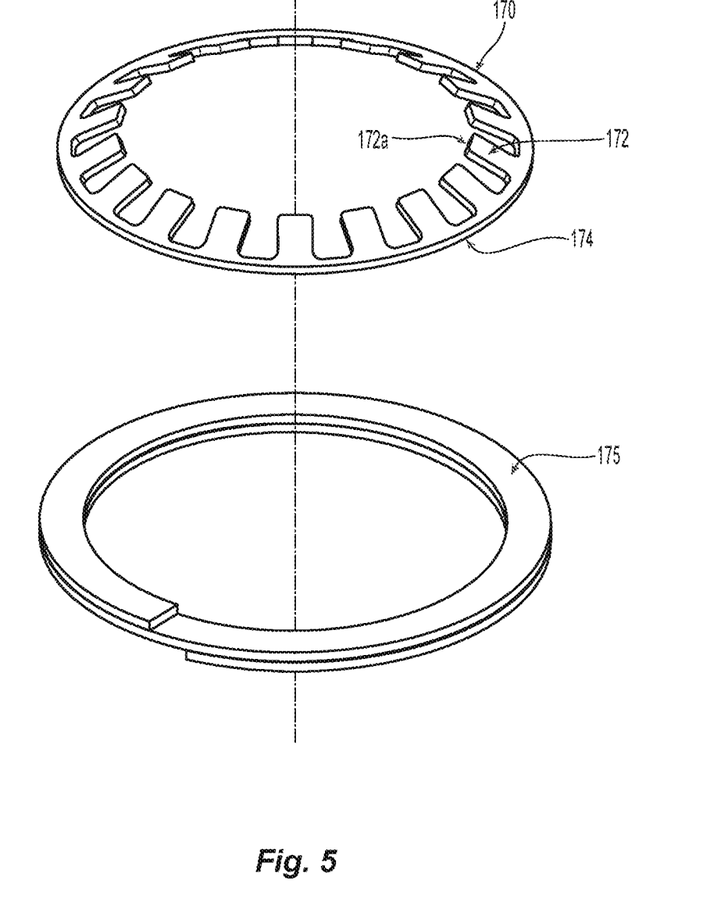
FIG. 5 is an exploded view of a gripper ring and retainer ring for use in the fittings of FIGS. 3 and 4.
Figure 6:
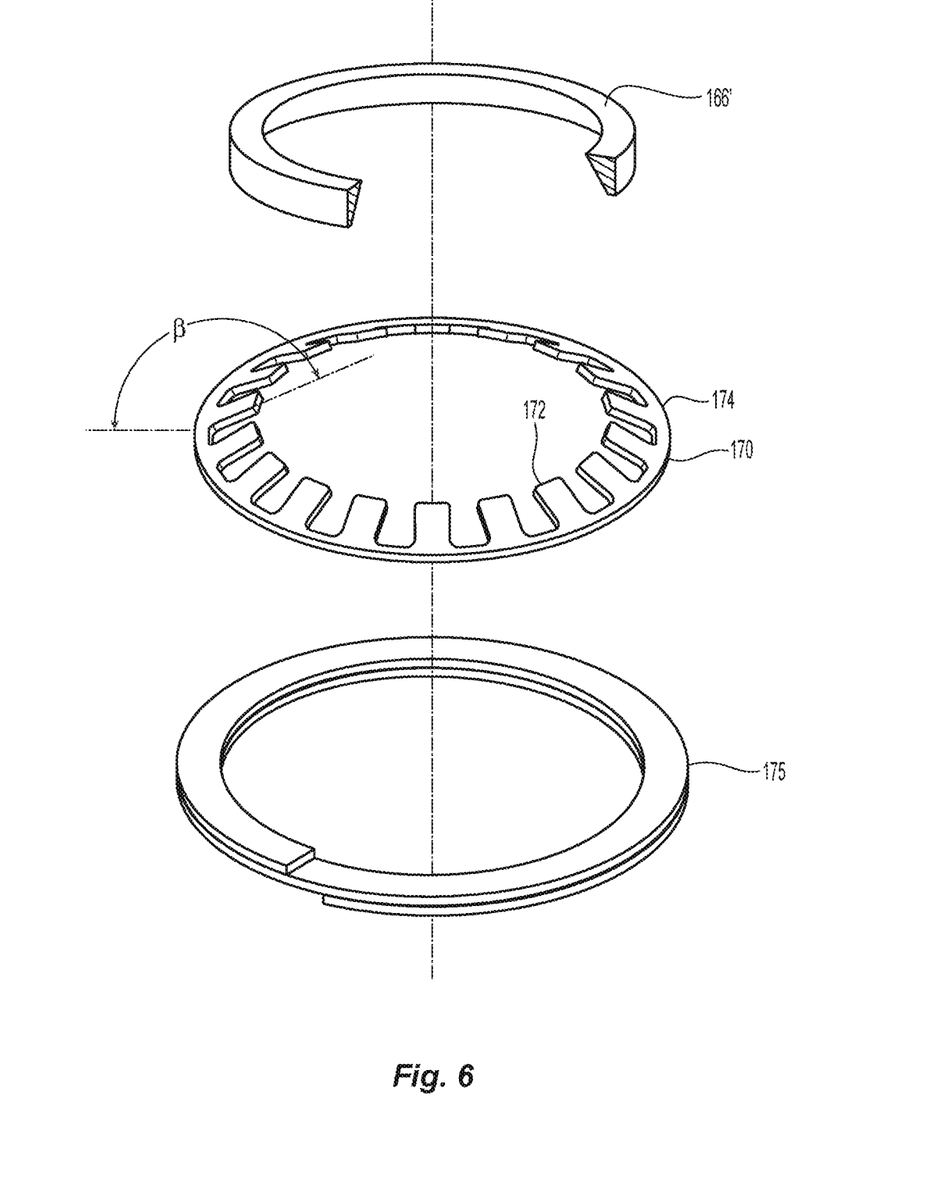
FIG. 6 is an exploded view of an annular insert, gripper ring and retainer ring for use in the fittings of FIGS. 3 and 4.

Referring again to FIG. 3, the second stop surface 168b of the fitting 150 can be formed as an annular planar surface disposed perpendicular to the second longitudinal axis B-B to limit the axial insertion of the sprinkler 110 into the passageway 158. The second stop surface 168b' can be skewed or chamfered with respect to the axis B-B to facilitate coaxial insertion of the sprinkler 110 into the passageway 158. As seen in FIGS. 2A-2B, the outer encasing surface 112b of the sprinkler body 112 includes a first portion along which the seal member 111 is located and defines a first diameter D1 sized to support the seal member 111 engagement with the cylindrical sealing surface 160 of the fitting 150. The encasing surface 112 includes a second portion having a second diameter D2 that is greater than the first diameter D1 along which the helical surface 115 is formed. The difference in diameters D1, D2 between the first and second portion defines a step transition or shoulder surface 113 separating the first portion and second portions of the encasing surface 112b. In some embodiments, the shoulder surface 113 is located along the encasing surface 112b so that upon sprinkler insertion of the sprinkler into the fitting 150 the axial distance between the shoulder surface 113 and the gripper ring 170 is greater than the axial distance between the seal member 111 and the shoulder surface 113. Accordingly as depicted in FIGS. 3 and 4, the axial length L1 of the sealing surface 160 can be smaller than the axial length L2 between the entrance to the sealing surface 160 and the internal groove 164 supporting the retainer ring 175. The axial spacing between the surfaces and components ensures that engagement between the sprinkler 110 and the gripper ring 170 is maintained after the seal member 111 and seal surface are disengaged thereby relieving the fluid seal between the sprinkler body 112 and the tubular member 150 before completely decoupling the two components. In some embodiments, the axial spacing between the surfaces can locate inlet end 116 of the leading portion 115a of the sprinkler body 112 within the sealing surface 160 upon insertion of the sprinkler body before engagement of the trailing portion 115b with the gripper ring 170.

Figure 7A:
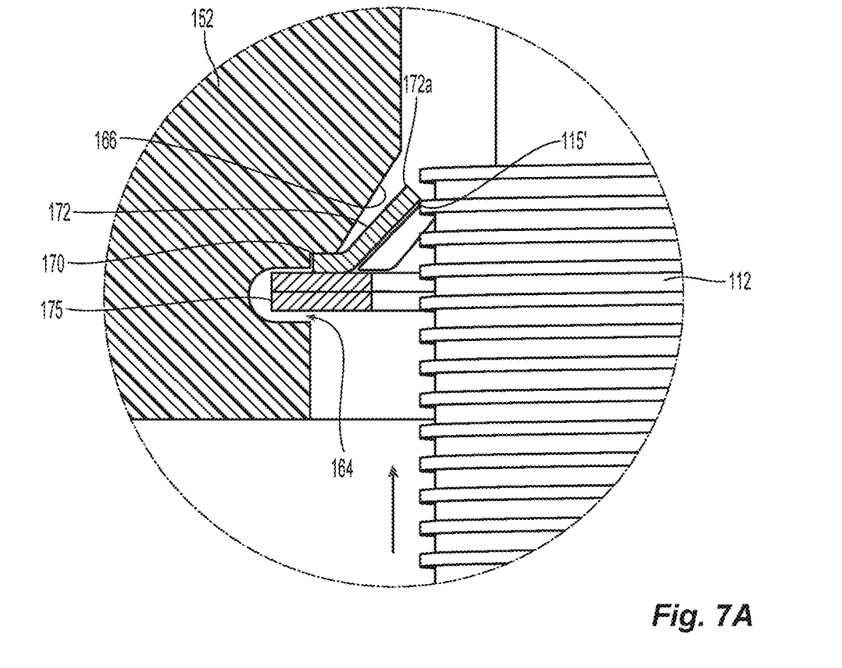
FIGS. 7A-7B are detailed views of the engagement between the gripper ring and the sprinkler body for use in the assembly of FIG. 1.
Figure 7B:
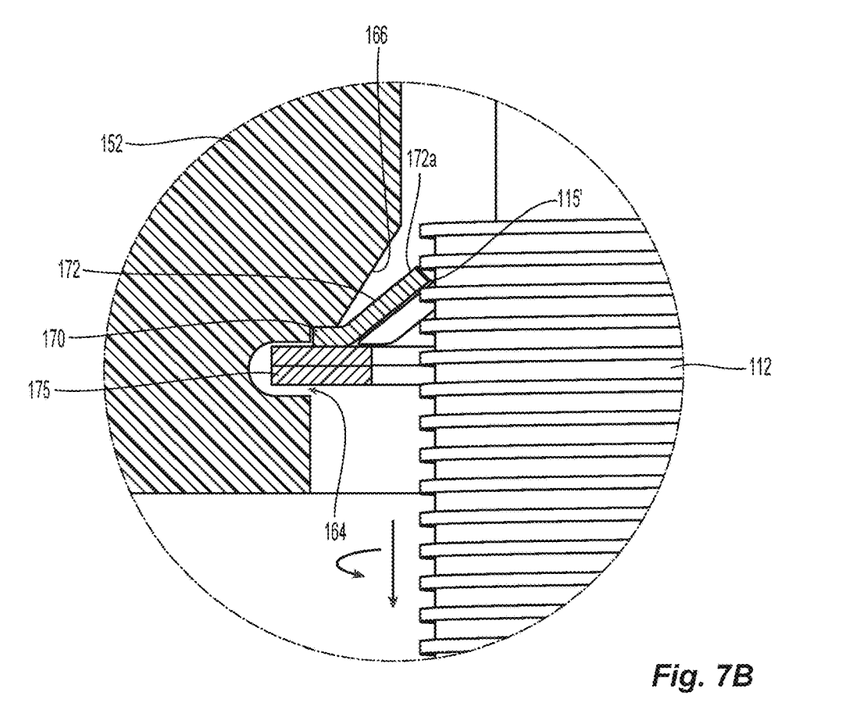
Figure 7C:
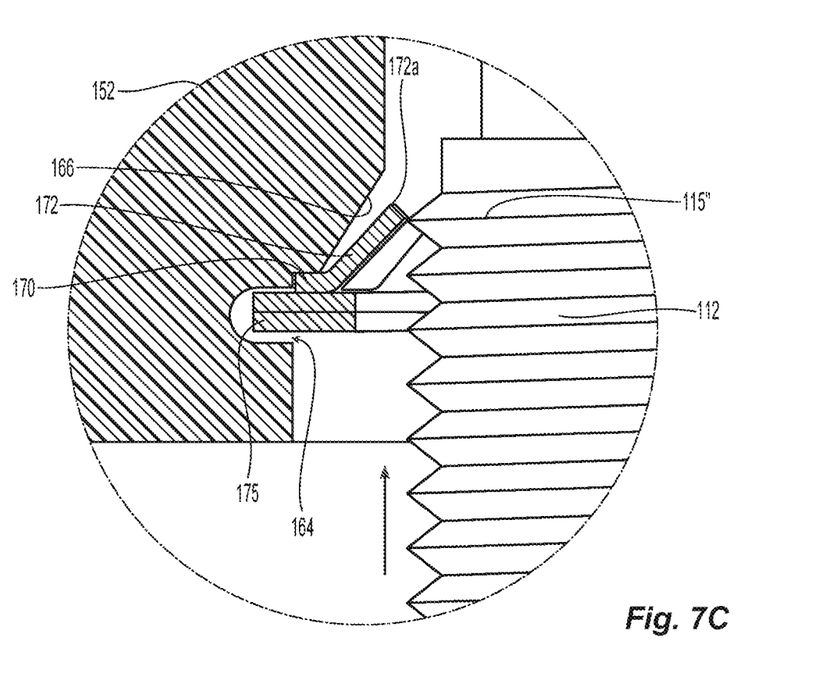
FIGS. 7C-7D are detailed views of the engagement between the gripper ring and the sprinkler body for use in the assembly of FIG. 1.
Figure 7D:
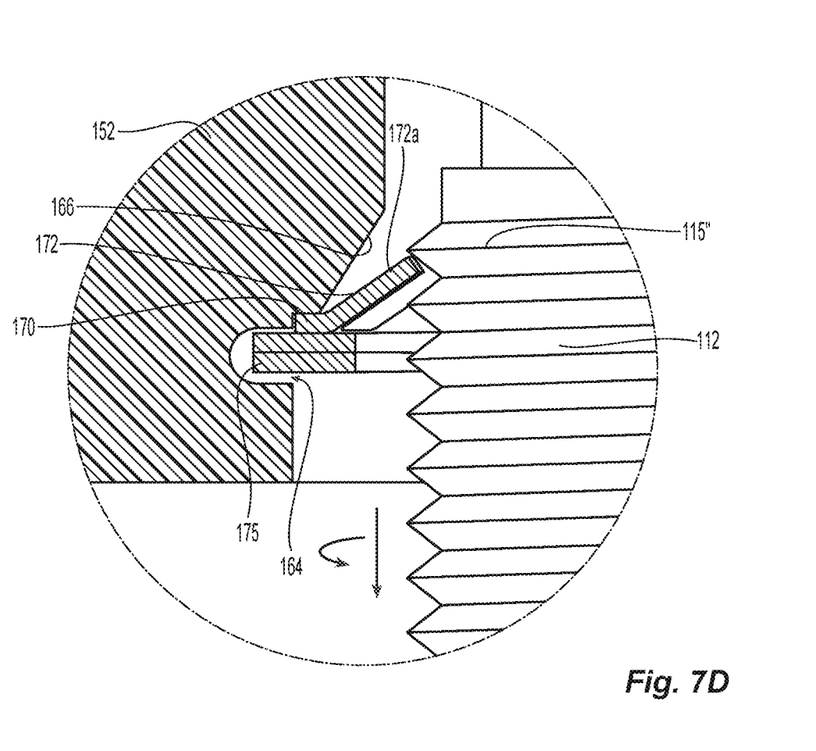

FIGS. 7A-7D depict detailed interaction and engagement of the sprinkler body 112 and the gripper ring 170 within the fitting 150. The outer encasing surface 112b, such as the helical surface 115, forms an adjustable mechanical connection with the internal gripper ring 170 of the fitting 150 to adjustably form and locate the fluid tight seal of the seal member 111 within the fitting 150 and couple the sprinkler 110 and tubular member 152 to one another. The helical surface 115 can be formed and/or machined in or about the outer encasing surface 112b to facilitate the displacement and retention of the prongs 172. The helical surface 115 can be formed by, for example but not limited to, placing a helical overlay about the sprinkler body, cutting or forming a groove or forming thread such as a buttress thread, a swept thread, a square thread, as depicted for example, in FIGS. 7A-7B, or a straight thread as depicted in FIGS. 7C-7D. A helical thread can provide for at least two complete rotations of the sprinkler after seal 111 and seal surface 160 disengage before disengagement between the sprinkler 110 and the gripper ring 170. In some embodiments, the thread defines a pitch that ranges from eight (8) threads per inch (TPI) to sixteen (16) TPI, and in some embodiments is greater than 16 TPI, such as for example, thirty-two (32) TPI with a small pitch, such as for example, 32 threads per inch (32 TPI). It is to be understood that the pitch and other characteristics of the thread can be varied and combined to provide for the desired engagement and adjustability with the fitting 150. Regardless of the type of thread and/or the pitch, the helical thread 115 can provide a minimum thread engagement between the sprinkler 110 and the gripper ring 170 to safely retain the sprinkler 110 and allow for relief of fluid pressure before completely removing the sprinkler 110 for replacement or maintenance.

As was described with respect to FIGS. 2A and 2B, the sprinkler 110 is initially inserted into the tubular member 152 axially or linearly pushed or driven into the internal conduit 158 such that the seal member 111 of the sprinkler 100 is in fluid sealing contact with the sealing surface 160 location. Depicted in FIGS. 7A and 7C is the contact between the gripper ring 170 and the helical surface 115, embodied as a helical thread, as the sprinkler is axially inserted and translated within the tubular member 152 from the second end 156 to the first end. The fingers or prongs 172 of the gripper ring 170 are splayed outwardly, as seen for example in FIGS. 7A and 7C by the passing contact the crests of the helical surface 115. With the prongs of the gripper ring 170 splayed outwardly, the sprinkler body can be purely linearly inserted to its installed position, as depicted for example, in FIG. 2B.

In order to release the sprinkler 110 from the PCRR fitting 150 for removal or adjustment, the engagement between the gripper ring 170 and the helical surface 115 of the sprinkler limits the sprinkler body 112 to linear and rotational translation with respect to the tubular member 152 in the direction from the first end 154 to the second end 156 of the tubular member 152. As depicted for example in FIGS. 7B and 7D, the ends 172a of the prongs 172 of the gripper ring 170 are engaged within the valley or groove of the thread 115. Linearly withdrawing the sprinkler 110 from the tubular member results in the thread elements forcing the prongs 172 of the gripper ring 170 radially inward to grip the sprinkler body 112. Thus, the sprinkler 110 can be prevented from being axially driven out of the fitting 150 under the axial force of the water supply or by inadvertent impact. In order to remove the sprinkler or disengage the fluid tight seal, the sprinkler 110 is linearly and rotationally translated with respect to the tubular member 152 from the first end 154 to the second end 156. Given the axial spacing in some embodiments between internal components of the assembly as previously described, the sprinkler 110 can be initially rotationally translated or unthreaded so that the prongs 172 of the gripper ring 170 follow the helical pitch of the surface 115 to release the sealed engagement between the sealing member 111 and the sealing surface 160. The initial unthreading can release any fluid pressure from the sprinkler assembly 100 before safely and completely removing the sprinkler 110 by continued unthreading. The removed sprinkler 110 can be serviced or replaced. In some embodiments, because the sealing member 111 can be affixed or secured to the sprinkler body 110, removal of the sprinkler 110 enables removing and replacing the sealing member 111 as needed. It should be understood that the engagement between the gripper ring 170 and the helical surface of the sprinkler body 115 can allow for the sprinkler body 110 to be threaded and advanced into tubular member 152 in order to, for example, more finely locate the seal member 111 along the seal surface 160.

Figure 8:
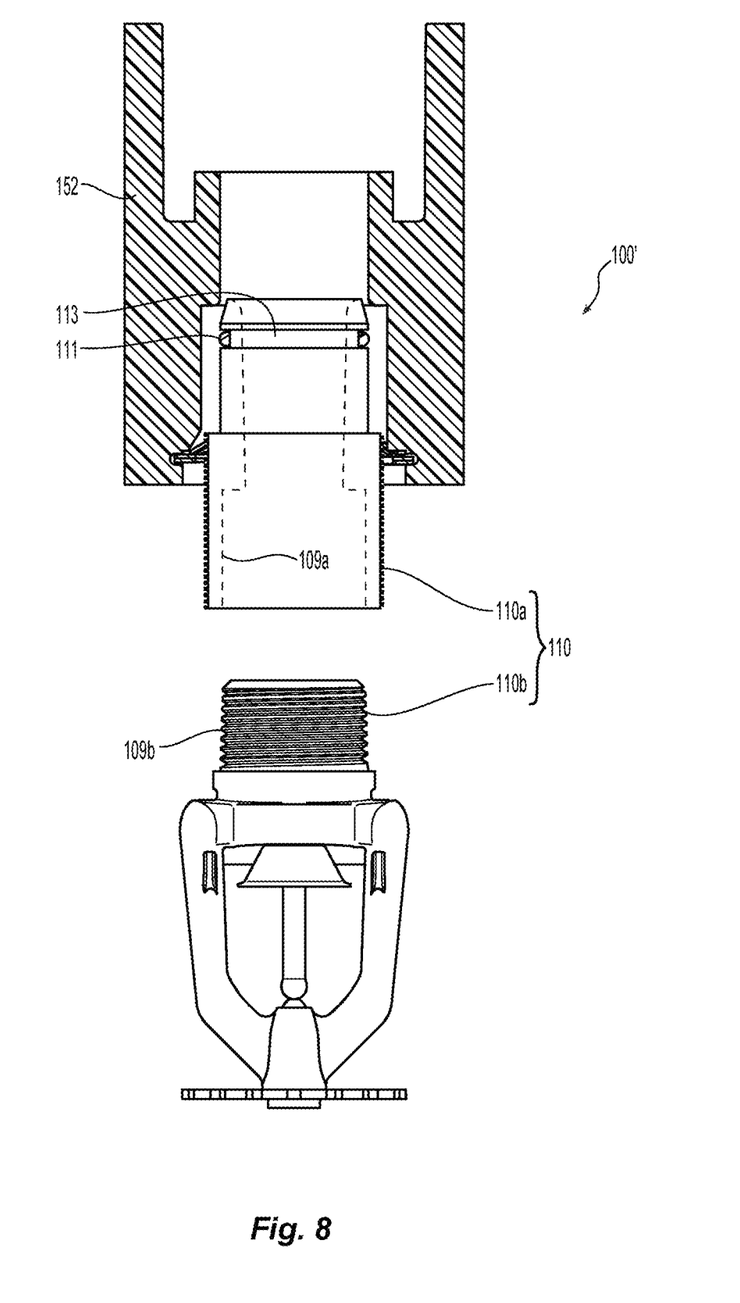
FIG. 8 is a diagram of an embodiment of a sprinkler assembly.

As has been described herein, the sprinkler assembly 100 can include a sprinkler body 110 that is integrally formed. In some embodiments, as depicted in FIG. 8, a sprinkler assembly 100' includes a sprinkler body 110 that includes a sprinkler insert 110a and a separate sprinkler component 110b that is coupled to the insert 110a. The insert 110a includes an encasing surface having the external recess 113 and sealing member 111 along with an external thread 115 as previously described. The insert 110a also includes an internal thread 109a for complimentary threaded engagement with the external thread 109b of the sprinkler component 110b. The external thread 109b can be a tapered thread, such as for example, NPT thread. In some embodiments, the sprinkler 110b can be an externally threaded sprinkler for engagement with insert 110a and assembled with the PCRR fitting 150. Accordingly, the sprinkler assembly 100' can provide for an adapter to convert a standard threaded sprinkler into a sprinkler assembly for push-to-connect-rotate-to installation.

While the present disclosure has been disclosed with reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A sprinkler assembly, comprising:
    a sprinkler, comprising:
        a body having an internal passageway and an outer surface, the internal passageway extending along a longitudinal axis from a first end to a second end, the outer surface including a sealing surface and a helical surface; and
        a deflector coupled with the body, the helical surface between the deflector and the seal; and a fitting to form a push-to-connect-rotate-to-release (PCRR) connection with the sprinkler, the fitting including:
  a tubular member extending from a first end to connect with a pipe and a second end to connect with the sprinkler, the tubular member comprising an inner surface having a sealing surface portion and a groove between the sealing surface portion and the second end;
  a retainer ring disposed in the groove; and
  a gripper ring disposed along the inner surface of the tubular member and in contact with the helical surface, the retainer ring between the gripper ring and the second end.

2. The sprinkler assembly of claim 1, comprising:
a pair of frame arms coupled with the body and the deflector.

3. The sprinkler assembly of claim 1, comprising:
the gripper ring comprises a base and a plurality of prongs extending radially inward from the base.

4. The sprinkler assembly of claim 1, comprising:
a chamfered surface contiguous with the groove.

5. The sprinkler assembly of claim 1, comprising:
the fitting is made of a plastic material.

6. The sprinkler assembly of claim 1, comprising:
a step or shoulder between the sealing surface and the helical surface.

7. The sprinkler assembly of claim 1, comprising:
an axial length of the sealing surface is less than an axial length from the sealing surface to the groove.

8. The sprinkler assembly of claim 1, comprising:
the helical thread is a buttress thread, a swept thread, a square thread, or a straight thread.

9. The sprinkler assembly of claim 1, comprising:
the helical thread has a pitch greater than or equal to 8 threads per inch (TPI) and less than or equal to 32 TPI.

10. The sprinkler assembly of claim 1, comprising:
the sprinkler comprises a sprinkler insert to couple the body with the fitting.

11. A sprinkler assembly, comprising:
a sprinkler, comprising:
  a body having an internal passageway and an outer surface, the internal passageway extending along a longitudinal axis from a first end to a second end, the outer surface including a sealing surface and a helical surface; and
  a deflector coupled with the body, the helical surface between the deflector and the seal; and
a fitting, comprising:
  a tube extending from a first end to a second end, the tube comprising an inner surface having a sealing surface portion and a groove between the sealing surface portion and the second end;
  a retainer ring disposed in the groove; and
  a gripper ring disposed along the inner surface of the tubular member and in contact with the helical surface, the retainer ring between the gripper ring and the second end.

12. The sprinkler assembly of claim 11, comprising:
a pair of frame arms coupled with the body and the deflector.

13. The sprinkler assembly of claim 11, comprising:
the gripper ring comprises a base and a plurality of prongs extending radially inward from the base.

14. The sprinkler assembly of claim 11, comprising:
a chamfered surface contiguous with the groove.

15. The sprinkler assembly of claim 11, comprising:
the fitting is made of a plastic material.

16. The sprinkler assembly of claim 11, comprising:
a step or shoulder between the sealing surface and the helical surface.

17. The sprinkler assembly of claim 11, comprising:
an axial length of the sealing surface is less than an axial length from the sealing surface to the groove.

18. The sprinkler assembly of claim 11, comprising:
the helical thread is a buttress thread, a swept thread, a square thread, or a straight thread.

19. The sprinkler assembly of claim 11, comprising:
the helical thread has a pitch greater than or equal to 8 threads per inch (TPI) and less than or equal to 32 TPI.

20. The sprinkler assembly of claim 11, comprising:
the sprinkler comprises a sprinkler insert to couple the body with the fitting.

* * * * *